United States Patent
Matthieu et al.

(10) Patent No.: US 9,791,841 B2
(45) Date of Patent: Oct. 17, 2017

(54) DESIGNER INTERFACE FOR CONTROL SYSTEMS

(71) Applicant: Citrix Systems, Inc., Fort Lauderdale, FL (US)

(72) Inventors: Chris Matthieu, Tempe, AZ (US); Geir Ramleth, Palo Alto, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 610 days.

(21) Appl. No.: 14/458,054

(22) Filed: Aug. 12, 2014

(65) Prior Publication Data

US 2016/0048114 A1 Feb. 18, 2016

(51) Int. Cl.
G06F 21/62 (2013.01)
G05B 15/02 (2006.01)
H04L 12/28 (2006.01)
H04W 4/00 (2009.01)

(52) U.S. Cl.
CPC ........... *G05B 15/02* (2013.01); *G06F 21/629* (2013.01); *H04L 12/2803* (2013.01); *H04W 4/005* (2013.01)

(58) Field of Classification Search
None
See application file for complete search history.

(56) References Cited

U.S. PATENT DOCUMENTS

| 9,021,139 | B1 * | 4/2015 | Kim | ...................... | H04W 12/06 |
| | | | | | 709/250 |
| 2005/0015507 | A1 | 1/2005 | Chin | | |
| 2008/0064391 | A1 | 3/2008 | Cai et al. | | |
| 2009/0206986 | A1 | 8/2009 | Murakami et al. | | |
| 2011/0001605 | A1 | 1/2011 | Kiani et al. | | |
| 2011/0063105 | A1 | 3/2011 | Bennett et al. | | |
| 2012/0323368 | A1 | 12/2012 | White et al. | | |
| 2014/0149559 | A1 | 5/2014 | Parviainen-Jalanko et al. | | |
| 2014/0149599 | A1 * | 5/2014 | Krishna | .................. | H04L 69/08 |
| | | | | | 709/232 |

(Continued)

OTHER PUBLICATIONS

Non-final Office Action mailed Jun. 25, 2015 for U.S. Appl. No. 14/626,562, filed Feb. 19, 2015, 11 pages.

*Primary Examiner* — Isaac T Tecklu
(74) *Attorney, Agent, or Firm* — Kilpatrick Townsend & Stockton LLP

(57) ABSTRACT

Tool for designing a control system for an IoT device. Tool includes input blocks. An input block represents first IoT device, third-party messaging account, or computing device. First device or account identified using first UUID. Tool includes output blocks. An output block represents second IoT device, third-party messaging account, or computing device. Second device or account identified using second UUID. One input block or one output block represents an IoT device. IoT device senses or controls and is connectable to WAN. Tool includes function blocks. A function block represents function that processes information received from the input blocks. First UUID determines first device or account identified using first UUID from which to receive information. The function blocks provide a command to the output blocks. Second UUID determines second device or account identified using second UUID to provide command. Input, output, and function blocks positionable in interface to form control system.

20 Claims, 10 Drawing Sheets

(56) References Cited

U.S. PATENT DOCUMENTS

| | | |
|---|---|---|
| 2014/0149771 A1 | 5/2014 | Krishna et al. |
| 2015/0149478 A1 | 5/2015 | Krishna et al. |
| 2015/0222621 A1* | 8/2015 | Baum ................. H04L 63/0807 726/9 |
| 2015/0237071 A1* | 8/2015 | Maher .................... H04L 63/20 726/1 |
| 2015/0319006 A1* | 11/2015 | Plummer ............ H04L 12/2827 700/83 |
| 2015/0319046 A1* | 11/2015 | Plummer ................ H04L 41/22 715/736 |
| 2016/0044032 A1* | 2/2016 | Kim ................... H04L 63/0876 726/5 |
| 2016/0044719 A1* | 2/2016 | Sidhu .................. H04W 76/021 370/329 |
| 2016/0292324 A1* | 10/2016 | Leonard .............. G06F 17/5009 |
| 2017/0094706 A1* | 3/2017 | Kim ................... H04W 76/023 |

* cited by examiner

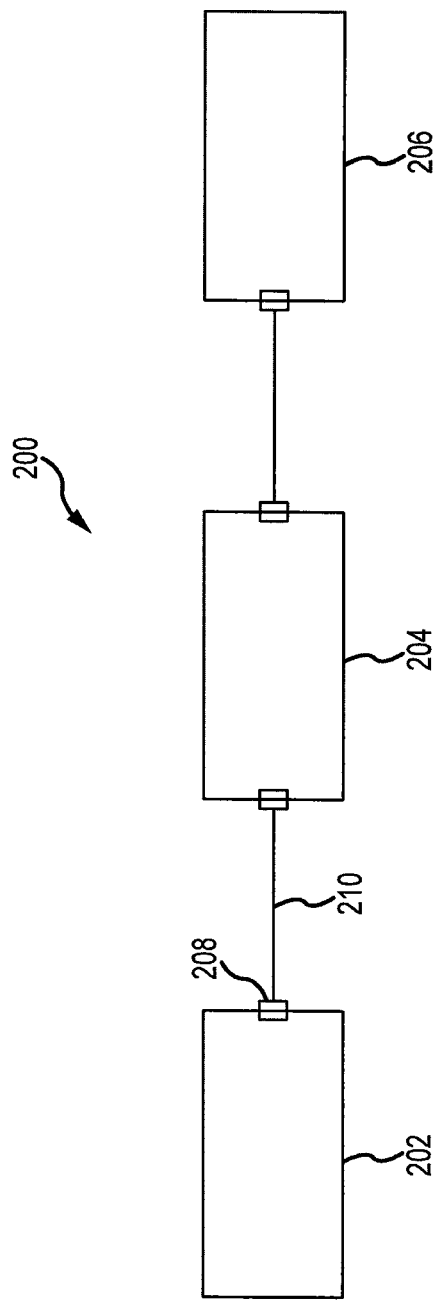

US 9,791,841 B2

DESIGNER INTERFACE FOR CONTROL SYSTEMS

BACKGROUND OF THE INVENTION

Internet of Things (IoT) systems provide the ability for network connectable devices to communicate with one another. Current IoT systems provide a limited selection of devices, often those devices sharing a common source and/or manufacturer, to interface with one another. Typically, those IoT systems enable only simple interactions between devices, oftentimes allowing only a single layer of processing and/or communication. IoT systems that do enable more complex interactions between devices tend to be usable only by users having sufficiently strong computer programming skills to program complex, multi-layered interactions. The lack of simple-to-use IoT systems that are capable of producing both simple and complex interactions between devices limits the breadth of functionality of IoT devices. Embodiments of the invention may provide solutions to these and other problems.

BRIEF SUMMARY OF THE INVENTION

In one embodiment, a tool for designing a control system that includes an Internet of Things (IoT) device is provided. The tool may include a plurality of input blocks. An input block may represent a first IoT device, a first third-party messaging account, or a first computing device. The first IoT device, the first third-party messaging account, or the first computing device may be identified using a first universally unique identifier (UUID). The tool may also include a plurality of output blocks. An output block may represent a second IoT device, a second third-party messaging account, or a second computing device. The second IoT device, the second third-party messaging account, or the second computing device may be identified using a second UUID. At least one input block of the plurality of input blocks or at least one output block of the plurality of output blocks may represent the IoT device. An IoT device may include sensing or control functionality and may be connectable to a wide area network (WAN).

The tool may further include a plurality of function blocks. A function block may represent a function configured to process at least a portion of information received from at least one of the plurality of input blocks. The first UUID may be used to determine the first IoT device, the first third-party messaging account, or the first computing device from which to receive the information. The plurality of function blocks may be further configured to provide a command to at least one of the plurality of output blocks. The second UUID may be used to determine the second IoT device, the second third-party messaging service, or the second computing device to provide the command. The plurality of input blocks, the plurality of output blocks, and the plurality of function blocks may be positionable in an interface to form the control system for the IoT device.

In another embodiment, a method for providing a tool for designing a control system for an IoT device is provided. The method may include providing a plurality of input blocks. An input block may represent a first IoT device, a first third-party messaging account, or a first computing device. The first IoT device, the first third-party messaging account, or the first computing device may be identified using a first UUID. The method may also include providing a plurality of output blocks. An output block may represent a second IoT device, a second third-party messaging account, or a second computing device. The second IoT device, the second third-party messaging account, or the second computing device may be identified using a second UUID. At least one input block of the plurality of input blocks or at least one output block of the plurality of output blocks may represent the IoT device. An IoT device may include sensing or control functionality and is connectable to a WAN.

The method may further include providing a plurality of function blocks. A function block may represent a function configured to process at least a portion of information received from at least one of the plurality of input blocks. The first UUID may be used to determine the first IoT device, the first third-party messaging account, or the first computing device from which to receive the information. The plurality of function blocks may be further configured to provide a command to at least one of the plurality of output blocks. The second UUID may be used to determine the second IoT device, the second third-party messaging service, or the second computing device to provide the command. The method may also include presenting an interface for designing the control system for the IoT device. The plurality of input blocks, the plurality of output blocks, and the plurality of function blocks may be positionable in the interface to form the control system.

In another embodiment, a computer program embodied on a computer readable medium is provided. The computer program may include instructions executable by a computer to provide a plurality of input blocks. An input block may represent a first IoT device, a first third-party messaging account, or a first computing device. The first IoT device, the first third-party messaging account, or the first computing device may be identified using a first UUID. The computer program may also include instructions configured to provide a plurality of output blocks. An output block may represent a second IoT device, a second third-party messaging account, or a second computing device. The second IoT device, the second third-party messaging account, or the second computing device may be identified using a second UUID. At least one input block of the plurality of input blocks or at least one output block of the plurality of output blocks may represent the IoT device. An IoT device may include sensing or control functionality and may be connectable to a WAN.

The computer program may further include instructions configured to provide a plurality of function blocks. A function block may represent a function configured to process at least a portion of information received from at least one of the plurality of input blocks. The first UUID may be used to determine the first IoT device, the first third-party messaging account, or the first computing device from which to receive the information. The plurality of function blocks may be further configured to provide a command to at least one of the plurality of output blocks. The second UUID may be used to determine the second IoT device, the second third-party messaging service, or the second computing device to provide the command. The computer program may further also include instructions configured to present an interface for designing the control system for the IoT device. The plurality of input blocks, the plurality of output blocks, and the plurality of function blocks may be positionable in the interface to form the control system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 depicts an example of a basic control system designed using a designer interface, according to embodiments of the invention.

DETAILED DESCRIPTION OF THE INVENTION

Figure 1:
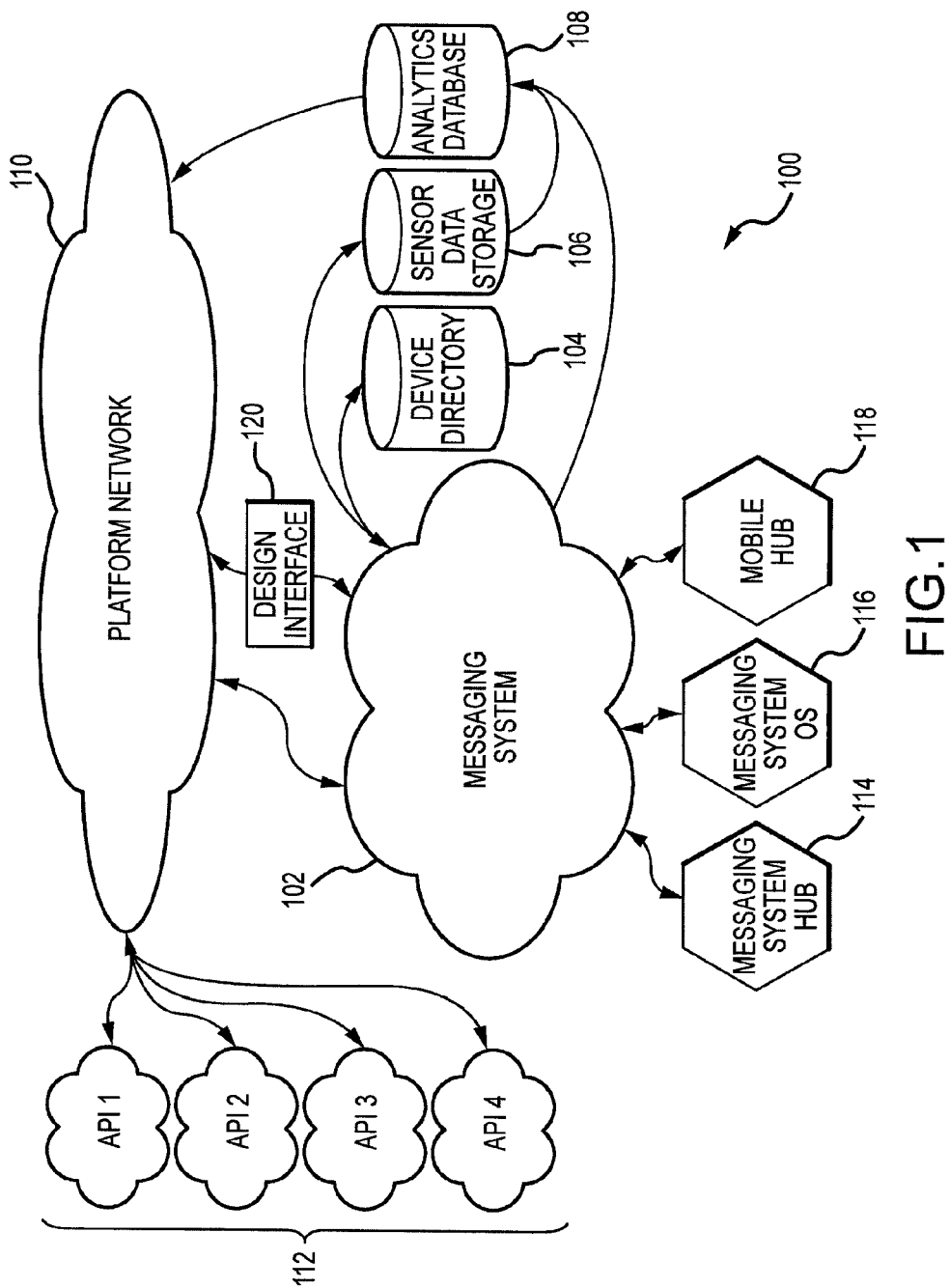
FIG. 1 is a system diagram of a system for connecting devices, such as Internet of Things (IoT) devices, other devices or machines, and/or systems, according to embodiments of the invention.

For the purposes of explanation, the ensuing description provides specific details are set forth in order to provide a thorough understanding of various embodiments. It will be apparent, however, to one skilled in the art that various embodiments may be practiced without some of these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments. In other instances, well-known structures and devices are shown in block diagram form.

A control system design tool may include a graphical interface that allows users to design complex control systems for IoT devices. The design tool may include input and output blocks that represent various devices and/or systems, as well as function blocks that represent various functions. These blocks may be arranged on the graphical interface by dragging and dropping the blocks to form a control system. The devices and systems represented by the input and/or output blocks may include any device and/or system that is connectable to a wide area network (WAN), regardless of the source or manufacturer. By arranging and connecting the input blocks, function blocks, and output blocks, a user may form a control system for an IoT device. Combinations of many different inputs, functions, and/or outputs may be used, allowing a user to quickly design simple and/or very complex, multi-layered control systems involving any number of systems and/or devices. Many of the blocks include pre-defined computer code such that a user may design an advanced control system with this tool with little to no computer programming ability.

In one embodiment, a tool for designing a control system that includes an Internet of Things (IoT) device is provided. An IoT device may include any device or system having sensing or control functionality. IoT devices are also connectable to a wide area network (WAN), even if much of the time the device is only connected to a local network and/or completely unconnected from a network. An IoT device may not include cellular network connectivity. For example, an IoT device may not include a cellular network radio. A number of input blocks, output blocks, and function blocks may be provided by the tool. Each of the blocks may be positionable in a graphical interface to form the control system for at least one IoT device. The IoT device is represented by at least one input block and/or at least one output block. In some embodiments, the control system may include multiple IoT devices, with each IoT device being represented by a different block. The control system may be represented by a combination of one or more input blocks, output blocks, and/or function blocks in the graphical interface. The operation of the control system will flow from any input blocks, through any function blocks. The function blocks provide commands to be executed by one or more devices or systems, each represented by an output block. Oftentimes, the control system will flow from inputs on the left to outputs on the right. However, it will be appreciated that other designs and/or flows may be possible.

The graphical interface may be provided and run by a remote server or other networked system having processing power. Any calculation, processing, or relaying of messaging may be done using the remote server's processing and networking resources. In some embodiments, the graphical interface may loop and/or update continuously to process control system operations in real-time. In other words, the graphical interface provided by the remote server may actively detect events, inputs, payloads, and/or any other messages that may be associated or directed at a device or system having an authenticated application programming interface (API) and universally unique identifier (UUID) associated with the tool. Each device and/or system authenticated for use with the tool is associated with a UUID such that the tool can recognize the device and/or system and direct messages and other payloads appropriately. Each device and/or UUID may have an API associated with it. The API of a device and/or UUID enables the tool to provide payloads in a correct format for a device, to access systems and hardware of a device, and or to receive information from the device. UUIDs may also be associated with HTTP(S)-related devices, WebSocket devices, short message service (SMS) devices, etc.

In some embodiments, input blocks, output blocks, and function blocks are positioned on a palette or sidebar of the graphical interface, where individual blocks may be dragged and dropped into the graphical interface to form the control system. Each of the blocks may include one or more nodes that serve as connection points for the blocks to be connected. As input blocks provide information to control systems, input blocks may include a node on a right side of the input block that allows connections to a function block and/or an output block to be made. Similarly, output blocks may include a node on a left side of the output block, such that payloads from input blocks and/or function blocks may be received by the output block. Function blocks may include nodes on both a left side and a right side of the function block, as information is often received from an input block, processed, and then provided as a command to an output block. One of ordinary skill in the art will appreciate that nodes may be arranged differently, such as on the left side of an input block, the right side of an output block, and/or on a top, bottom, and/or corner of any type of block.

The tool may include a number of input blocks. Input blocks may represent IoT devices, cloud servers, and other systems that may provide information to a control system.

Information may include data, messages, and/or other payloads that may be processed or otherwise used to control another IoT device. For example, an input block may represent a third-party messaging account that may send messages to other devices and systems. In some embodiments, third-party messaging accounts may include social media accounts. Social media accounts include any systems and accounts that allow users to transmit messages over a network. For example, the third-party messaging account, such as a Twitter account, may include a SMS message that includes a hashtag alerting the control system to perform a specified function. A hashtag or keyword may be included in the SMS or other message that alerts the control system that information is being supplied that needs to get passed to a function represented by a function block. Each of the devices, systems, and/or servers that are represented by an input block may be identified using a distinct UUID. UUIDs may be assigned to an IoT device or other system by enrolling the IoT device in a messaging system, platform network, and/or other networked system that hosts the design tool. A UUID may be generated and associated with an IoT device or system. For example, the UUID may be produced by a random number generator and then may be associated with the IoT device or system. In some embodiments, the distinct UUID may be an alphanumeric identifier associated with a phone number, system, and/or device. In some embodiments, such as for SMS messages, a phone number may be used as the UUID and/or included in the UUID. In some embodiments, an input block may represent a speech integration device. Such an input block allows a user to provide an input using a voice command that may control a function of an IoT device.

The tool may also include a plurality of output blocks. Similar to input blocks, output blocks may represent IoT devices, cloud servers, and other systems or devices. Output blocks receive information, payloads, and/or commands from input blocks and/or function blocks that direct the IoT devices, other devices, and/or systems represented by the output block to perform a function. Output blocks ensure that a message, command, or other payload is delivered properly and in a proper format to the device represented by the output block based on the UUID assigned to the represented device or system.

Each input and output available for the graphical interface may include an API. Each API from supported devices and systems is available to enable full functionality of the input and output devices. Oftentimes, a device manufacturer will have a proprietary API that must be used to gain access to and control some or all features of a device. APIs may be registered with the tool to provide users the ability to create control systems that utilize functions and features that use APIs. Input blocks, output blocks, devices and systems represented by blocks, and/or UUIDs associated with devices and systems may also be associated with one or more APIs. This allows a control system designed by the tool to properly receive information, process the information, and provide a command or other payload to a device, simply by connecting blocks to form a control system.

The tool may further include a number of function blocks. A function block may represent a function configured to process at least a portion of information received from at least one input block. In some embodiments, the functions represented by function blocks include code that performs predefined processes on information received from input and/or other function blocks. Some of the functions represented by function blocks may include user-editable computer code that may be configured to process at least a portion of the information received and to provide a command at least one output block. Functions represented by function blocks may enable any type of computer code to be included. For example, a function represented by a function block may include editable JavaScript Open Notation (JSON) that allows users to edit and/or write code for a custom process to perform on received information and/or to provide a command for a desired output block. The ability to edit functions represented by function blocks enables new features and functionality to be introduced into a control system. Additionally, the editable functions represented by function blocks allow a payload or other message to be put into a desired format for particular output devices. This is especially useful when new APIs are authenticated for use with the tool.

The graphical interface may also include function blocks that represent data analytics systems. The data analytics systems may gather information from devices, systems, and/or control systems for data analysis. For example, data from a device represented by an input block may be fed into a data analytic function represented by a function block that processes the data and produces a command based on this analysis. In some embodiments, a remote server or other networked system may provide commands or other decisions to one or more output blocks based on these analytics. For example, data from sensors may be provided to the analytics systems, which may process the data for trends. The analytics systems may issue a command to an output block based on the trends observed.

In some embodiments, each input block, output block, and/or function block may include a window that allows for the selection of various operating parameters of the block. In some embodiments, windows may be popup windows that are accessible by clicking, double clicking, or otherwise interacting with a block displayed by the graphical interface. In other embodiments, the windows may be provided as a panel on the graphical interface using an input device on a computing device and/or IoT device. Input devices may include keyboards, mice, touchscreens, styluses, and the like. A window for an input block may include fields that enable a user to specify operating parameters. Operating parameters may include a user identifier and/or device or system UUID that indicates a device, system, and/or account to be represented by a particular block. Fields may also allow a user to set a keyword or other input to trigger activation of a control system. Other operating parameters may include time intervals or periods of time that a control system is to be operated. Output blocks may include windows that allow the UUID of a desired output device to be selected. Function blocks may include windows that allow selection of information to process, as well as selection of rules to process the information. In function blocks having editable computer code, the computer code may be provided in the window.

Within the windows, all available APIs may be provided, such as in a drop-down list. The list may show a user which APIs have been authenticated for use with the graphical interface and that have registered UUIDs and/or security tokens. The available APIs may provide a user with an indication about what components and functions of a system or device are accessible by the tool. In some embodiments, the tool further includes the ability for a user to select and/or add an API and/or device that is not already authenticated within the system. For example, if a user knows a UUID and/or a security token and has permission to use the API, the device and/or API may be authenticated and added to the available devices and systems for building control systems using the graphical interface.

In some embodiments, a web-based developer toolkit or design interface may be provided. A web-based developer toolkit may include similar functionality as the graphical interface of the platform network described above, but operates locally as a web-based application. In some embodiments, the design interface may serve as a test environment and may be sandboxed or run as a virtual machine. By isolating the test code from the remote graphical interface, users are able to debug any of the control systems. Users may also use the design interface to design and test control systems and flows prior to fully deploying a control system into the remotely-based graphical interface to ensure the control system is secure. Users may have access to all IoT devices, other devices or machines, and/or systems associated with the remote graphical interface, although the processing functions available are limited to those provided by the functionality of a web browser. In some embodiments, additional functionality may be provided in the web-based design interface. For example, the browser may have access to components of a user's computer, such as a microphone and/or camera. A control system developed and run on the web-based design interface may include input blocks representing these components of the computer, allowing a control system to access these features. A remotely-based graphical interface, such as that described above, that relies on processing power of a remote system may not have access to these components. A user may import the control system into the remotely hosted graphical interface for continuous operation of the control system. In some embodiments, the web-based design interface may include a test block or button that may be connected to a control system. The test button may be used to run a single instance of the control system to provide a single controlled input to the control system so that a user may test the control system prior to deployment. One of ordinary skill in the art will appreciate that the test button may be used to run more than one instance of the control system, as needed. In some embodiments, a test button may also be included in the remotely-based graphical interface.

FIG. 1 depicts a system 100 for connecting devices, such as Internet of Things (IoT) devices, other devices or machines, and/or systems. IoT devices include any device or system having sensing or control functionality. IoT devices are also connectable to a wide area network (WAN), even if much of the time the device is only connected to a local network. The system 100 may also include third-party messaging services (i.e., Facebook, twitter, LinkedIn, SMS, etc.) as well as non-IoT computing devices and systems. The system 100 utilizes one or more remote servers, or clouds, that are in communication with other devices via a network, such as the Internet, an intranet, a local area network (LAN) or wide area network (WAN). The remote servers may have sufficient processing power to run an application, store data, or perform any other computing task. The remote servers allow IoT devices, other devices or machines, and/or systems connected to the servers to communicate with other IoT devices, other devices or machines, and/or systems from anywhere in the world. The remote servers provide processing power to applications running on both devices and on the server itself, while also being connected to a network via the Internet and/or other connection platforms such that the servers may be accessed from anywhere. Messaging system 102 is an open source machine to machine messaging platform, meaning that the messaging system 102 enables IoT devices, other devices or machines, and/or systems to message or otherwise communicate with other IoT devices, other devices or machines, and/or systems.

Messaging system 102 may be configured to support multiple protocols, such as hypertext transfer protocol (HTTP), websockets, message queuing telemetry transport (MQTT), constrained application protocol (CoAP), and others. Messaging system 102 may also support multiple developer platforms, such as software developer kits (SDK), such as Node.JS, JavaScript, Python, Ruby, and the like. The support of multiple developer platforms and protocols provides programmers the flexibility to customize functions and instructions for IoT devices, other devices or machines, and/or systems connected to messaging system 102. Upon registering with messaging system 102, each device, person, system and/or machine is assigned or otherwise provided with a distinct universally unique identifier (UUID) and/or a distinct security token. Each IoT device, other device or machine, and/or system must communicate its distinct UUID and security token to access messaging system 102. The messaging system 102 may use each UUID to process, route, and/or otherwise manage messages and other communications to an appropriate device, person, system, and/or machine.

Messaging system 102 may also be configured to interact with any application programming interface (API). Each API may also be assigned or otherwise provided with a distinct UUID and/or a security token. This enables messaging system 102 to receive instructions from and provide instructions to, any IoT device, other device or machine, and/or system that is connectable to messaging system 102. By being able to interact with any API, messaging system may control the functionality of all components of a registered IoT device, other device or machine, and/or system that are accessible by the messaging system 102. Accessible IoT devices, other devices or machines, and/or systems include any device that has been registered with messaging system 102 and has been provided a UUID and/or security token. For example, a user may purchase an IoT device. The user must register the particular IoT device with the messaging system 102 in order to receive a UUID and/or security token to make the IoT device accessible to the messaging system 102. In some embodiments, messaging system 102 may be configured such that a single message transmitted by messaging system 102 may communicate with multiple devices and/or systems having different APIs. Messaging system 102 may also detect, connect, and/or communicate with similar servers, allowing messaging system 102 to route messages to IoT devices, other devices or machines, and/or systems on the other servers via a server-to-server connection. Server-to-server communications may include connections used to transfer data from one server to another. For example, a user may use multiple "cloud" servers to store different types of information. A user may want to transfer or otherwise use data from a first server in a second server. A server-to-server communication allows the user to directly transfer this information to the second server.

IoT devices, other devices or machines, and/or systems may able to connect with messaging system 102 in several ways. For example, a gateway or messaging system hub 114 is an instance of messaging system software that may be installed at a location such as a home, office, or in the field. In some embodiments, the messaging system hub 114 may be run on operating systems, such as, but not limited to, Linux™, Mac™ OS, and/or Windows™. In some embodiments, a messaging system hub 114 may be a standalone physical device, such as a wireless router or modem, which runs the hub software that connects to a WAN and the messaging system 102. In other embodiments, a messaging system hub 114 may be integrated into an IoT device, other device or machine, and/or system by installing the hub software onto the IoT device, other device or machine, and/or system. For example, the messaging system hub 114 may be run on computing devices such as a Raspberry Pi, a home and/or office computer, Intel™ Galileo, Beagle Bones, Yuns, and/or other micro-computers. Messaging system hub 114 may allow other IoT devices and systems to connect to messaging system 102 via the computing device. When operated on a computing device, messaging system hub 114 may make the computing device broadcast a private network signal such that IoT and other devices and systems may be securely connected to the messaging system hub 114 for connection to messaging system 102. Regardless of physical form, IoT devices, other devices or machines, and/or systems may be connected to messaging system hub 114, which then links the IoT devices, other devices or machines, and/or systems to messaging system 102 in real-time. IoT devices, other devices or machines, and/or systems may be connected to messaging system hub 114 using a native protocol of the IoT device, other device or machine, and/or system. The protocols may include, but are not limited to, Transmission Control Protocol (TCP), User Datagram Protocol (UDP), WiFi, ZigBee, Bluetooth low energy (BLE), and any other protocol. The connection of a device or system to the messaging system 102 allows connected IoT devices, other devices or machines, and/or systems to communicate with one another. In some embodiments, messaging system hub 114 is on a LAN side of a firewall, network address translations (NAT) firewall, etc. Messaging system hub 114 may use WebSockets to connect to messaging system 102. The connection between WebSockets and messaging system 102 is a bi-directional persistent connection that may auto-reconnect when Internet connectivity is available. Because the messaging system hub 114 is inside any firewalls, any systems and/or devices connected to messaging system hub 114, messaging system hub 114, and/or messaging system 102 may communicate through any firewalls. The messaging system hub 114 may be used to connect every IoT device, other device or machine, and/or system a person or business has, serving as a secure connection for communicating with messaging system 102, much like a personal firewall.

IoT devices, other devices or machines, and/or systems may also be able to connect with messaging system 102 using a messaging system operating system (OS) 116. Messaging system OS 116 may be installed on an IoT device, other device or machine, and/or system, such as a computing device. Computing devices may include Raspberry Pi boards, Arduino boards, other microcontrollers, minicomputers, and the like. The computing devices may connect directly to messaging system 102 using messaging system OS 116. The computing device running messaging system OS 116 connects to messaging system 102 using a UUID and a token and awaits instructions from messaging system 102. Messaging system 102 may then act as a compute server that controls the messaging system OS 116. For example, messaging system 102 may activate and/or deactivate pins of the computing device, request sensor data from the computing device, and/or perform other functions related to the computing device. In some embodiments, messaging system OS 116 may be a mobile OS or application that is able to run on mobile device operating systems, such as iOS and Android™ operating systems.

IoT devices, other devices or machines, and/or systems may further be able to connect with messaging system 102 using a mobile hub 118. A mobile hub 118 is similar to a messaging system hub 114, but instead is installed and operated on a mobile device. For example, mobile hub 118 may be installed in a mobile phone to make the mobile phone connectable to messaging system 102. Mobile hub 118 may access all sensors on the mobile device. For example, geolocation sensor data, compass headings, and/or accelerometer data of a mobile phone may be provided to messaging system 102 through mobile hub 118. Mobile hub 118 may also be installed in wearable technology, such as pedometers, headsets, watches, and the like, as well as in Bluetooth™ low-energy devices. Additionally, any devices that are able to connect to a mobile device, such as by using a Bluetooth interface, a near field communication (NFC) interface, a wired connection, a radio connection, and any other wireless communication interface, are able to connect to messaging system 102 through the mobile hub 118 of the mobile device.

Information from messaging system 102, including information transmitted to messaging system 102 by messaging system hub 114, messaging system OS 116, and/or mobile hub 118, may be transmitted to one or more data storage systems. For example, information about IoT devices, other devices or machines, and/or systems registered with messaging system 102 may be transmitted to device directory 104 for storage. Upon registration of an IoT device, other device or machine, and/or system, all information about the IoT device, other device or machine, and/or system is stored in device directory 104. For example, information related to when the IoT device, other device or machine, and/or system comes online or offline may be stored in device directory 104. Device directory 104 may also maintain various lists, such as white lists and/or black lists. For example, device directory 104 may maintain a whitelist that includes a list or array of UUIDs that may discover the IoT device, other device or machine, and/or system, those that may send a message to the IoT device, other device or machine, and/or system, those that may subscribe to the IoT device, other device or machine, and/or system, and/or those that may configure the IoT device, other device or machine, and/or system. A blacklist may include a list or array of UUIDs that may not discover the IoT device, other device or machine, and/or system, those that may not send a message to the IoT device, other device or machine, and/or system, those that may not subscribe to the IoT device, other device or machine, and/or system, and/or those that may not configure the IoT device, other device or machine, and/or system. The use of whitelists and blacklists ensures that users only have access to those UUIDs, IoT devices, other devices or machines, and/or systems for which the users have permission. In some embodiments, the device directory 104 is queriable, such that a user may be provided with a list and/or array of IoT devices, other devices or machines, and/or systems that fit requested criteria. For example, upon polling the device directory 104, a user may be provided with a list and/or array of IoT devices, other devices or machines, and/or systems and/or UUIDs of IoT devices, other devices or machines, and/or systems that the user has access to, are currently online, and are discoverable to the user based on the user's UUID and/or security token The use of these white lists and/or black lists also operates as a security feature, as the lists ensure that users only have access to appropriate IoT devices, other devices or machines, and/or systems.

In some embodiments, data from sensors of registered IoT devices, other devices or machines, and/or systems may be transmitted to sensor data storage 106. This data may be streamed from a registered IoT device, other device or machine, and/or system through messaging system 102 in real-time. Sensor data storage 106 is queriable such that a user may poll sensor data storage 106 to receive data from specified sensors from a specified time period. A user may also be able to query the sensor data storage 106 for all available data from one or more sensors. In some embodiments, information from sensor data storage 106, as well as additional information from messaging system 102, may be transmitted to an analytics database 108. In some embodiments, analytics database 108 may not be queried by a user of the system 100. In other embodiments, analytics database 106 may be queried by a user of the system 100. The information stored in analytics database 108 may be accessible via a platform network 110.

Platform network 110 may include one or more analytics engines that may process the information received from the analytics database 108. The analytics engines may aggregate the received information, detect trends, and/or perform other analytics on the information. Platform network 110 may be communicatively coupled with a number of APIs 112 that are used to create, manage, identify, and/or communicate with functions of different IoT devices, other devices or machines, and/or systems. APIs may include, for example, sales analytics APIs, social media account and other third-party messaging account APIs, stock quote APIs, weather service APIs, other data APIs, mobile application APIs, and any other suitable API. For example, a Facebook™ or other social media message may use a messaging API to send SMS messages. Platform network 110 may use the messaging API to deliver a payload to a device or system configured to display a SMS message. A light API may be provided by a manufacturer of "smart" light bulbs. The platform network 110 would then use this light API to provide an output to turn a light bulb connected to the platform network 110 on or off Platform network 110 is also in communication with messaging system 102 using the APIs of messaging system 102. Platform network 110 may interact with the IoT devices, other devices or machines, and/or systems connected through the messaging system 102 using UUIDs and/or security tokens.

The UUIDs and/or security tokens may be issued by the messaging system 102 and/or the platform network 110. In some embodiments, a user may register systems and/or devices with the messaging system 102. The platform network 110 then imports or otherwise utilizes any UUIDs and/or tokens issued from this registration. In some embodiments, a user may register devices and/or systems with the platform network 110. The platform network 110 then issues UUIDs and security tokens to IoT devices, other devices or machines, and/or systems upon registration of the IoT device, other device or machine, and/or system. These UUIDs and security tokens are used to access the messaging system 102. In some embodiments, a user may register devices and/or systems with both the messaging system 102 and the platform network 110. Either messaging system 102 or platform network 110 may issue UUIDs and/or tokens. Registration with the non-issuing system or network creates a link or other association with the issued UUIDs and/or security tokens. In some embodiments, multiple servers or other systems may each operate an instance of software that includes the messaging system 102, thus creating multiple cloud servers and/or instances of messaging systems 102. In some embodiments, a particular instance of messaging system 102 may have its own UUID that allows the instance of messaging system 102 to connect to another instance of messaging system 102 to form a mesh network. Such a mesh network may allow messages and other payloads to be routed between devices across messaging systems 102.

Platform network 110 may operate an application or other program that provides a designer graphical interface that allows a user to drag and drop blocks that represent various IoT devices, other devices or machines, and/or systems, inputs and/or outputs from various IoT devices, other devices or machines, and/or systems, and/or functions to create a control system or flow. Any IoT device, other device or machine, and/or system that is registered with platform network 110 may be configured to receive or transmit a message to any other IoT device, other device or machine, and/or system that is registered with platform network 110 using an appropriate control system designed using the designer graphical interface. Messages may be transmitted from one device or system to control operation of another device or system. For example, the platform network 110 may run these control systems continuously, such that an input from a device or system may automatically cause an event to occur in a different location and/or by a different device or system. Such functionality, along with access to the data from analytics database 108, enables platform network 110 to monitor a performance, behavior, and/or state of any IoT device, other device or machine, and/or system within the control system and to send a resulting message or payload to any other IoT device, other device or machine, and/or system in the control system based on the monitored performance, behavior, and/or state. In another example, the platform network 110 may run a control system designed using the designer graphical interface upon receiving a command, such as from a user or from another device or system. In some embodiments, the designer graphical interface operated by the platform network 110 may access any IoT device, other device or machine, and/or system connected to messaging system 102, including IoT devices, other devices or machines, and/or systems connected using the messaging system hub 114, messaging system OS 116, and/or mobile hub 118. This connection enables control systems created using the designer graphical interface to control output functions of devices and/or systems registered with the messaging system 102. For example, real-time monitoring of data at a remote location, such as performance of a machine or system, or of a person's health condition may be performed by the platform network 110.

The platform network 110 may also automatically provide messages or other outputs, including commands to any of the registered IoT devices, other devices or machines, and/or systems, based on processes performed on information received from IoT devices, other device or machine, and/or system. For example, sensor data may be received from an IoT device and processed by analytics systems of the platform network 110. Using artificial intelligence and/or machine learning within the platform network 110, the processed sensor data may be used to provide commands to another system or device connected to platform network 110.

In some embodiments, platform network 110 may be connected with messaging system 102 through a web-based design interface 120. Web-based design interface 120 may include similar functionality as the designer of platform network 110, but operates as a web-based application. Users may design control systems and flows on web-based design interface 120 and test the control systems prior to fully deploying a control system into platform network 110. Users may have access to all IoT devices, other devices or machines, and/or systems associated with messaging system 102 and/or platform network 110, although the processing functions available are limited to those provided by a web browser. Web-based design interface 120 may act as a developer design tool that functions through the capabilities of the web browser. A user may then import the control system into platform network 110 for continuous operation of the control system.

FIG. 2 shows an example of a control system 200 that may be designed using a tool or graphical interface, such as the graphical interface or tool 300 as described herein. Control system 200 includes an input block 202, a function block 204, and an output block 206. Input block 202 may represent an IoT device, third-party messaging account, or computing device. The device, account, or computing device represented by input block 202 passes a message, information, or other payload to a function represented by function block 204. Examples of payloads from devices, accounts, or computing devices represented by input blocks may include SMS messages, Twitter™ messages, Facebook™ messages, e-mail messages, and the like. The function represented by function block 204 processes at least part of the information and passes a command to output block such that a device or system represented by output block 206 may perform a function. In some embodiments, any functions represented by function block 204 may include computer code that may be executed by a cloud server. For example, the cloud server may receive a payload from an IoT device, third-party messaging account, or computing device. The payload may be processed by the cloud server according to instructions of the function represented by the function block 204, and a command or other payload may be sent to an IoT device or system represented by output block 206.

As one example, a user may send a message using a mobile device, such as a cellular telephone. The message, such as an SMS message, may include a keyword that signals the control system 200 to receive the message as a payload. The payload may be an instruction to control a feature of a device, such as switching a light bulb on. The cloud server may evaluate the payload according to the function represented by function block 204, and may provide a command to output block 206 based on this evaluation. Output block 206 may represent the device, here a light bulb, and the light bulb may be turned on. One of ordinary skill in the art will recognize that input blocks may represent any IoT device, third-party messaging account, or computing device, that function blocks may include instructions to perform any number of tasks associated with a device represented by an output block, and that output blocks may represent any number of devices and systems. Combinations of input blocks, function blocks, and output blocks may provide any number of possible permutations of control systems for IoT devices.

Each of the blocks may include one or more nodes 208 that serve as connection points. Nodes of different blocks may be connected to form a flow or control system. In some embodiments, input block 202 includes one or more nodes 208 on a right side of input block 202 that indicate information flows to the right from the input block 202. Function block 204 includes one or more nodes on both a left and a right side of function block 204 as information is received from input block 202 on the left and a command is provided to output block 206 on the right. Output block 206 may include one or more nodes on a left side of output block 206 as a command is received from function block 204 on the left. Nodes 208 are connectable using lines 210. Lines 210 may be inserted using a line connecting tool, by clicking on one node 210 and dragging a cursor to another node 210, or by any other method of connecting multiple nodes. Users may connect groups of blocks using the lines 210 to form control systems to perform a desired function. In some embodiments, nodes 208 and/or blocks may visually pulse in real-time as information, such as messages, sensor data, API calls, and/or other payloads flow through the nodes 208 and/or blocks. In some embodiments, nodes 208, any blocks, and/or control systems 200 may have UUIDs. This allows the nodes 208, any blocks, and/or control systems 200 to be shared with other users using a messaging system's security permissions architecture, such as security permissions architecture of messaging system 102.

Figure 3A:
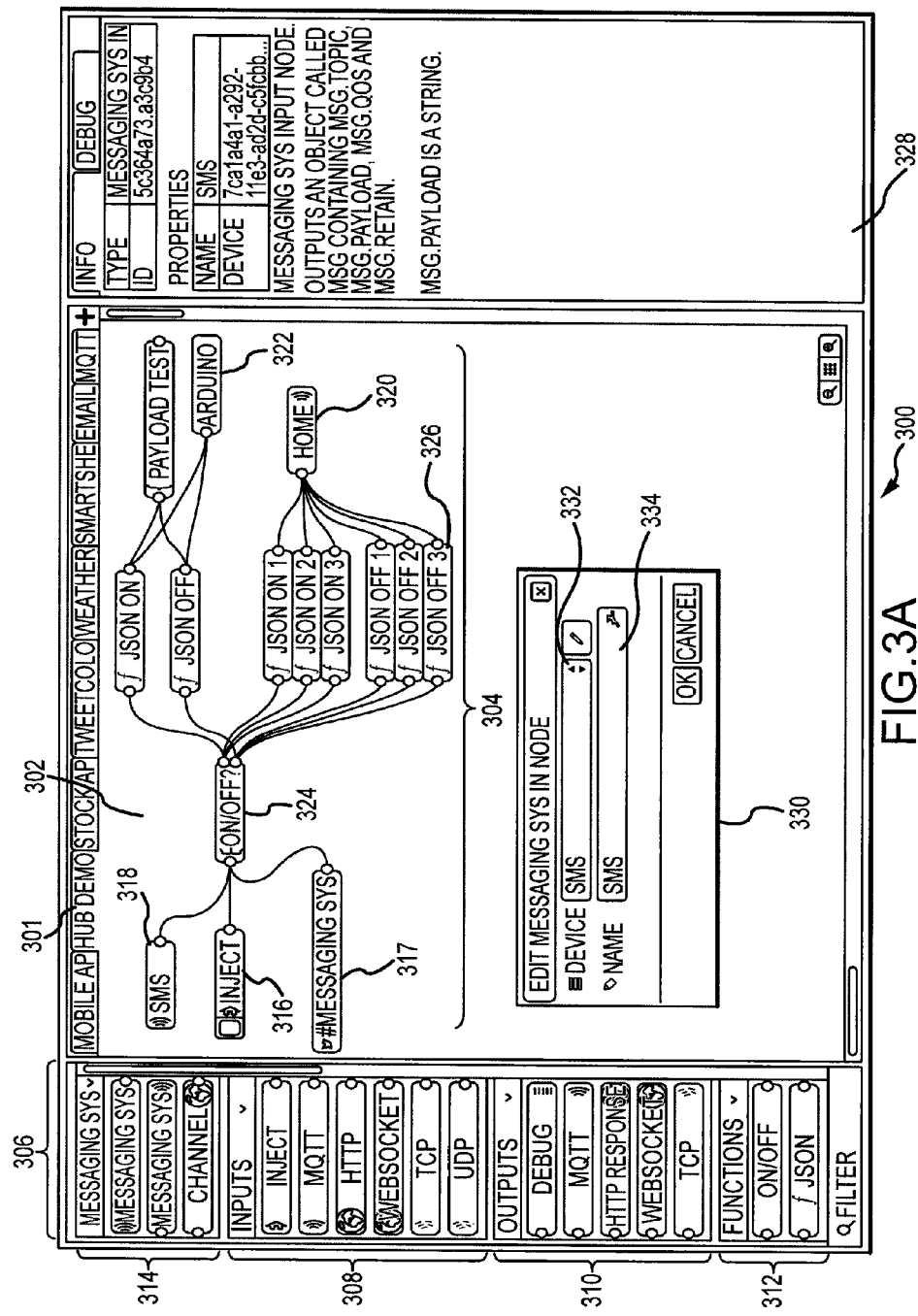
FIGS. 3A-3F depict examples of a designer interface for designing a control system for IoT devices, according to embodiments of the invention.

FIG. 3A depicts a tool 300 for designing a control system 304 that includes an IoT device. Control system 304 is one example of control system as described in FIG. 2. The tool 300 may include a graphical interface 302 on which input blocks, output blocks, and/or function blocks may be dragged and/or dropped to design the control system 304. In some embodiments, tool 300 may include one or more tabs 301 that allow a user to design different control systems 304 on different tabs 301. A user may create and/or delete tabs 301 to maintain a desired number of control systems 304. Tool 300 may include a sidebar or palette 306 that includes a number of input blocks 308, output blocks 310, and function blocks 312. Some blocks 314 on palette 306 may represent IoT devices. In some embodiments, at least one input block or at least one output block of the tool 300 represents an IoT device. In some embodiments, multiple IoT devices are included, each IoT device being represented by a different block. It will be appreciated that any number of combinations of input blocks 308, output blocks 310, and/or function blocks 312 may be combined to form control systems that perform any number of functions.

The control system 304 designed using tool 300 may include one or more input blocks 316 and 318, each input block 316 and 318 representing an IoT device, a third-party messaging account, or a computing device. Each of the IoT devices, third-party messaging accounts, and computing devices represented by blocks of the tool 300 may be identified using a distinct UUID that is provided when the IoT device, third-party messaging accounts, and/or computing device is registered for use with the tool 300, such as by registering with a messaging system and/or platform network as described in FIG. 1. Each IoT device, third-party messaging accounts, and/or computing device registered for use with the tool 300 may communicate with the tool 300 using a messaging system hub, interfacing with a computing device running an instance of the messaging system OS, and/or using a mobile hub as described in FIG. 1.

Input block 316 allows a message to be injected into the control system 304. In some embodiments, input block 316 is used during testing of the control system 304, as the message originates in input block 316 rather than being received from an IoT device, third-party messaging account, or other computing device. Input blocks may also represent an IoT device, third-party messaging account, or a computing device. Examples of third-party messaging accounts include a phone number, a social media account, or any other suitable account from which a user can send a message. Input blocks pass a message or other payload from the IoT device, third-party messaging account, or computing device into the control system 304. For example, input block 317 represents a third-party messaging account known as a Twitter™ account. The Twitter™ account may be identified using a user's username or handle, which may be associated with a UUID. Input block 317 may pass a Twitter™ message, or "Tweet," from the third-party messaging account to the control system 304. The content of the Tweet can be used by a function block to drive an output of the control system 304 that is provided to a device represented by an output block.

As another example, input block 318 represents a third-party messaging account, such as a telephone number, that passes an SMS message to the control system 304. The third-party messaging account associated with input block 318 is identified using its UUID. The UUID may correspond to a phone number or other identifier associated with the third-party messaging account, or the UUID may be a random identifier assigned by a messaging system and/or platform network. That SMS message may include a hashtag alerting the control system 304 to perform a specified function. A hashtag or keyword may be included in the SMS or other message that alerts the input block 318 that information is being supplied that needs to get passed to a function represented by a function block. One of ordinary skill will recognize that along with SMS and Twitter™ messages, a payload from a third-party messaging system may include an e-mail, a Facebook™ message, or any other message sent from a third-party messaging account.

The control system 304 may also include one or more output blocks 320 and 322, each output block 320 and 322 representing a different IoT device, a third-party messaging account, a computing device, or a system, (e.g., a cloud server, etc.). For example, output block 320 represents an IoT device, such as a "smart" light bulb that is connected to a WAN. The output block 320 may receive a command or other payload from a function represented by a function block and relay the command to the IoT device represented by the output block 320 and associated with a registered UUID. The IoT device represented by output block 320 then performs a function based on this command. For example, a command may instruct the light bulb represented by output block 320 to turn on or off. The light bulb may be in communication with the tool 300 using a messaging system hub, connecting via a processing device running an instance of the messaging system OS, and/or by connecting via a mobile device having a mobile hub installed as described in FIG. 1. Output block 322 represents an Arduino board that receives a command or other payload from functions represented by one or more function blocks. The Arduino board may be in communication with the tool 300 by a messaging system hub, a messaging system OS installed on the Arduino board, and/or a mobile hub installed on the Arduino board, as described in FIG. 1. In some embodiments, output blocks do not represent the same IoT device, a third-party messaging account, or a computing device as input blocks within a single control system. In other embodiments, a single IoT device, a third-party messaging account, or a computing device may be represented by one or more input blocks and/or one or more output blocks within a single control system. In some embodiments, at least one input block or at least one output block in control system 304 designed using tool 300 represents an IoT device.

Control system 304 may also include one or more function blocks 324 and 326, each function block 324 and 326 representing a function configured to process at least a portion of information received from at least one input block. In some embodiments, several function blocks may be arranged in series and/or parallel. When in series, each function represented by a function block may process at least a portion of information received from an input block, either directly or in the form of information processed by another function represented by a function block. Each function represented by function block 324 and 326 determines which IoT device, third-party messaging account, or computing device from which to receive the information based on the UUID associated with the input block. Each function represented by function block 324 and 326 may be configured to provide a command to at least one output block. The functions represented by function blocks 324 and 326 determine which IoT device, third-party messaging account, or computing device to provide the command based on the UUID associated with the output block. Function block 324 may represent a switch, such as an on-off switch, routing received messages based on properties and content of the message. For example, when a message includes the word "on" or "off," the function represented by function block 324 routes the message to an appropriate function block 326. A function represented by function block 326 can deliver a message or payload to a connected output block, the payload directing the device or system associated with the output block to perform a specified function. Here, a function represented by function block 326 commands a "smart" light bulb to turn off.

In some embodiments, tool 300 includes an information panel 328. Information panel 328 may provide information regarding a particular block. The information may include a type of the block, a UUID or other identifier associated with the block, a name and/or description of an IoT device, third-party messaging system, or computing device represented by the block, a description of the function of the block, a payload type, an operating period and/or interval, whether the block has a repeating function, a status of the block and/or the device or system represented by the block, and/or any other information related to the block. Each type of block in tool 300 may include a distinct group of information and properties that are provided in information panel 328. Information panel 328 is provided as a quick reference as to the function and/or status of each block, and is also useful as a guide to instruct a user how to design a control system using each block.

In control system 304, an input is received from a third-party messaging service, information related to the input is processed, and a command is output to a "smart" light bulb to turn the bulb on or off. In the example control system 304, an input is received by an input block 318 in the form of a SMS message containing a keyword. The input block is connected to function block 324 that relays information, here a keyword, to a function represented by function blocks 326. Based on the keyword received, the information will be passed to a function represented by function block 326 to turn a light on or off. The function represented by function block 326 then provides a command to an output block 320 that turns a light on or off.

Each block on the graphical interface 302 may include a window that allows for the selection of various operating parameters of the block. FIGS. 3A-3F depict examples of windows for different types of blocks. Each window may be a popup window that is accessible upon a double-click or other action by a user with the graphical interface. In some embodiments, the windows may open automatically upon selection of a block. A window 330 is associated with input block 318. Window 330 may include a device selection input 332. Device selection input 332 may allow a device that has been registered with tool 300 to be selected. Device selection input 332 may include a drop down list of devices or systems that have valid UUIDs and/or security tokens. A name field 334 may also be provided for a user to enter a name for the device or system. This may be especially useful when a user has registered a large number of similar devices or systems with the tool 300 and needs a way to distinguish between the devices or systems.

Figure 3B:
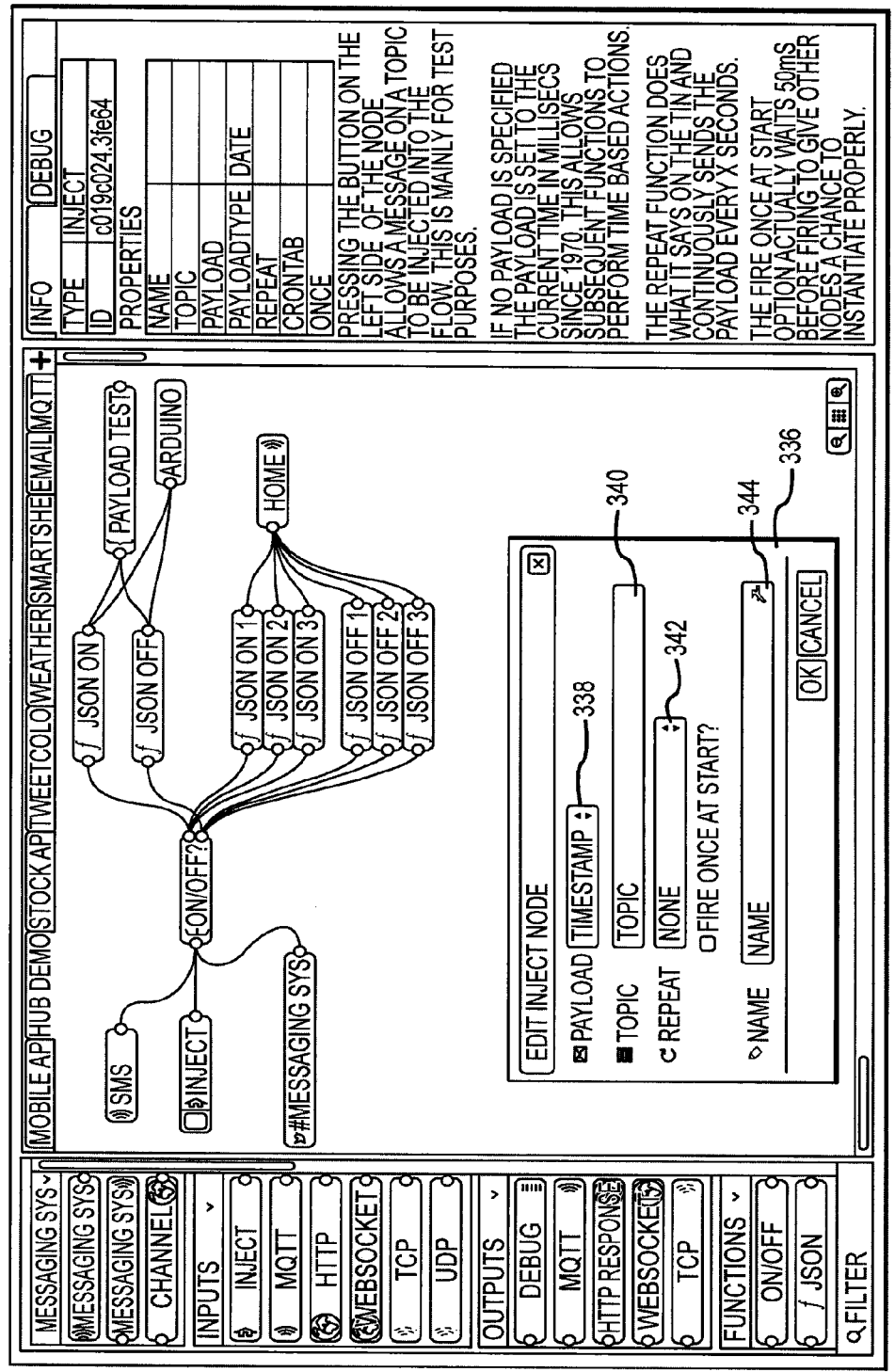

FIG. 3B shows a window 336 associated with input block 316. The window 336 may include a payload selector 338. Payload selector may include a drop down list that enables a user to select a form for a message or other payload that is to be passed to a function represented by a function block or output block. For example, a payload may be a timestamp, blank message, message string, or another form. The window 336 may also include a topic field 340, where a user may enter a topic for the payload. Window 336 may also include a repeat selector 342 that allows a user to select if, and how often, the input block sends the payload to a function represented by function block and/or output block. An option to fire once at start may also be included that waits a specified interval, such as between 25 and 100 milliseconds, before firing or operating the input block 316 to give other blocks and connections a chance to instantiate properly. Window 336 may also include a name block 344.

Figure 3C:
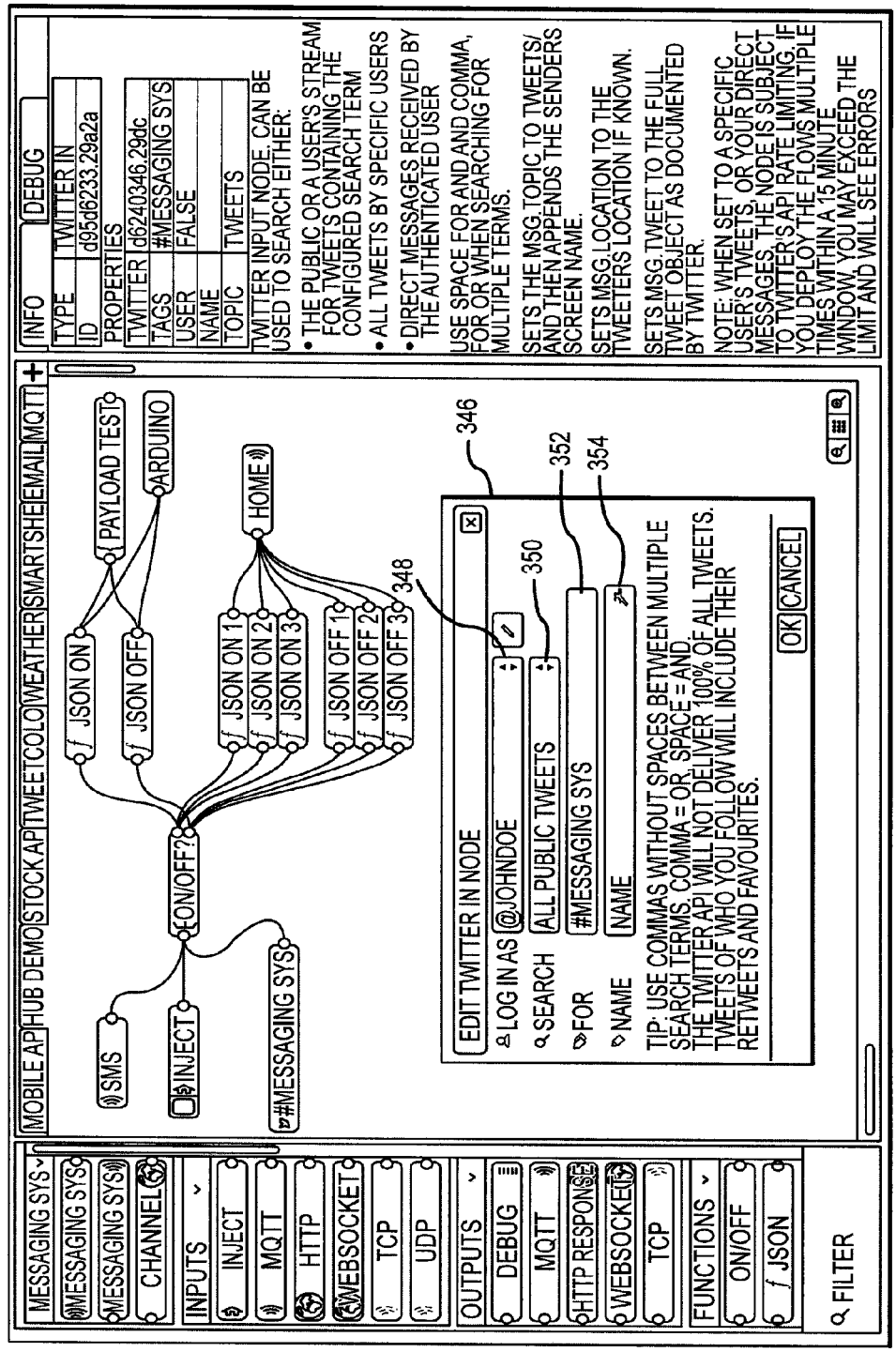

FIG. 3C depicts a window 346 associated with an input block that represents a third-party messaging account, such as a social media account. Specifically, window 346 is associated with input block 317, which represents a Twitter account. Window 346 may include a login field 348 that allows a user to select a registered account by a username or a handle. Each registered account has its own distinct UUID that enable the blocks of the control system 304 to properly identify a device or system for receiving an input from or for providing a command to. Window 346 may also include a search field 350 where a user may search for and specify what kinds of messages to use as inputs. For example, all public messages, messages in a user stream, messages from a particular user, and/or direct messages received by the selected account may be searched. Window 346 may also include a keyword field 352 for a user to select a keyword and/or hashtag to search for in the selected search field 350. Window 346 also includes a name field 354.

Figure 3D:
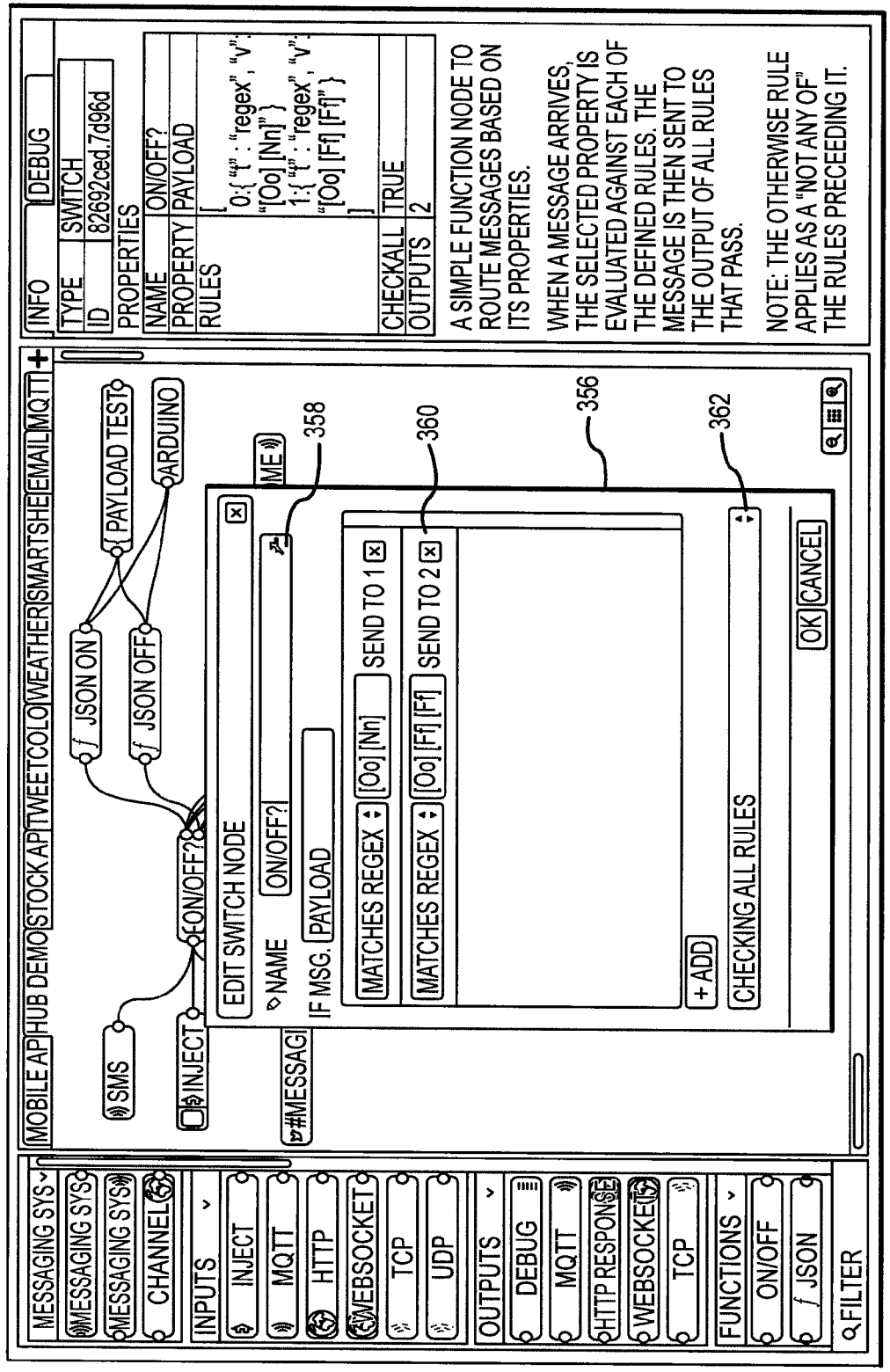

FIG. 3D shows a window 356 associated with function block 324. Window 356 may include name field 358 and a function field 360. Function field 360 may include an editable IF statement. For example, a user may select that if the payload includes a first word, then a command is sent to a first output block, and if the payload includes a second word, then a command is sent to a second output block. As one example, if the payload includes the word "on," a command is sent to a first output block to turn on a light. If the payload includes the word "off," a command is sent to a second output block to turn off the light. Multiple functions and/or rules may be included in function field 360. Window 356 may also include a rule selector 362 that allows a user to select which, if any, rules or functions are to be run.

Figure 3E:
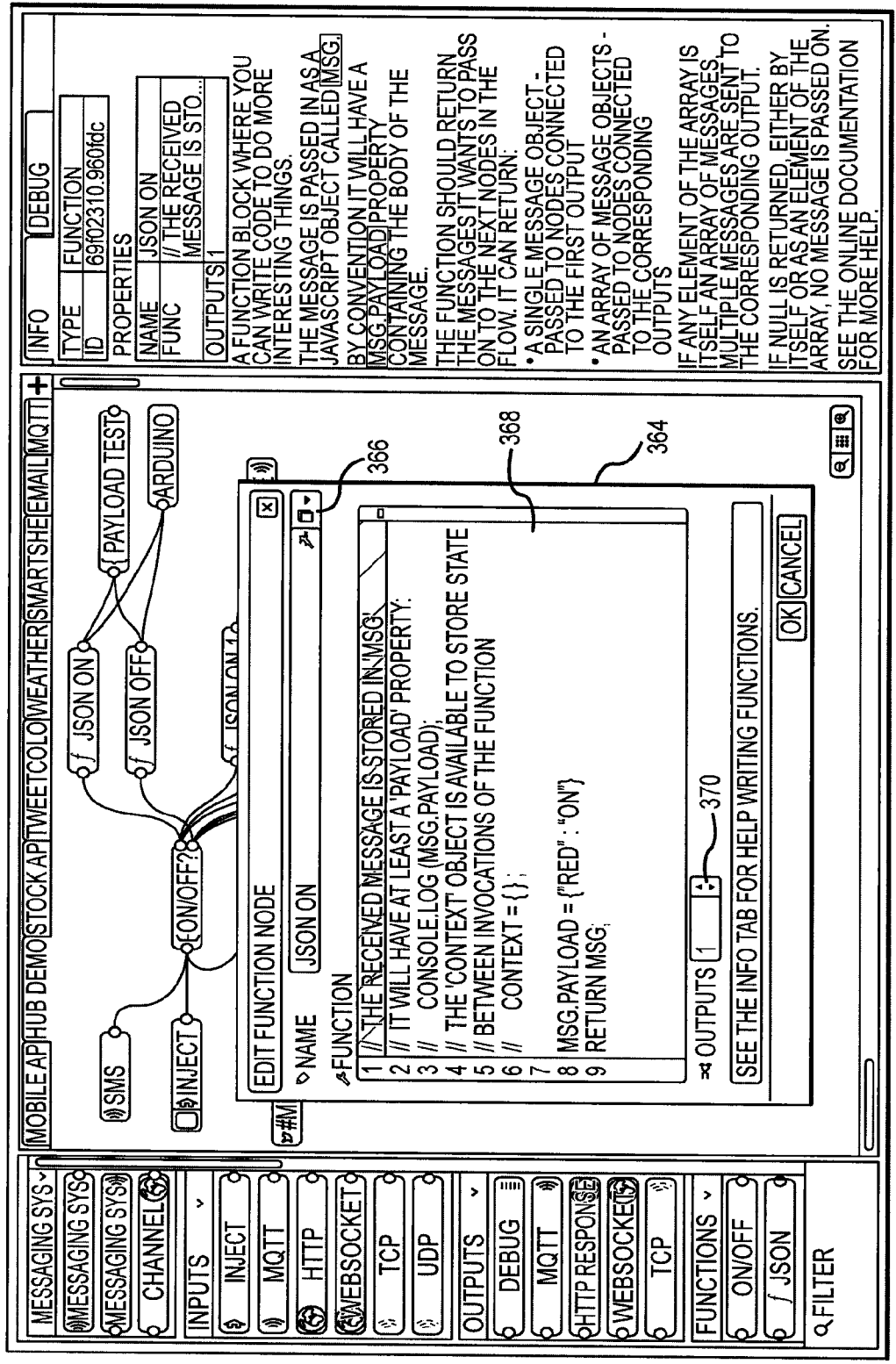

FIG. 3E depicts a window 364 associated with function block 326. Window 364 may include name field 366 and function field 368. Function field 368 allows a user to edit and/or write their own computer code that processes information from an input block and pass a command to an output block. Function field 368 may enable any type of computer code to be included. For example, function field 368 may include editable JavaScript Open Notation (JSON) that allows users to edit and/or write code for a custom process to perform on received information and/or to provide a command for a desired output block. Window 364 may also include an output selector 370. Output selector may enable a user to select a number of outputs for the function in function field 368, as well as set an output block for each function output when there are multiple outputs.

Figure 3F:
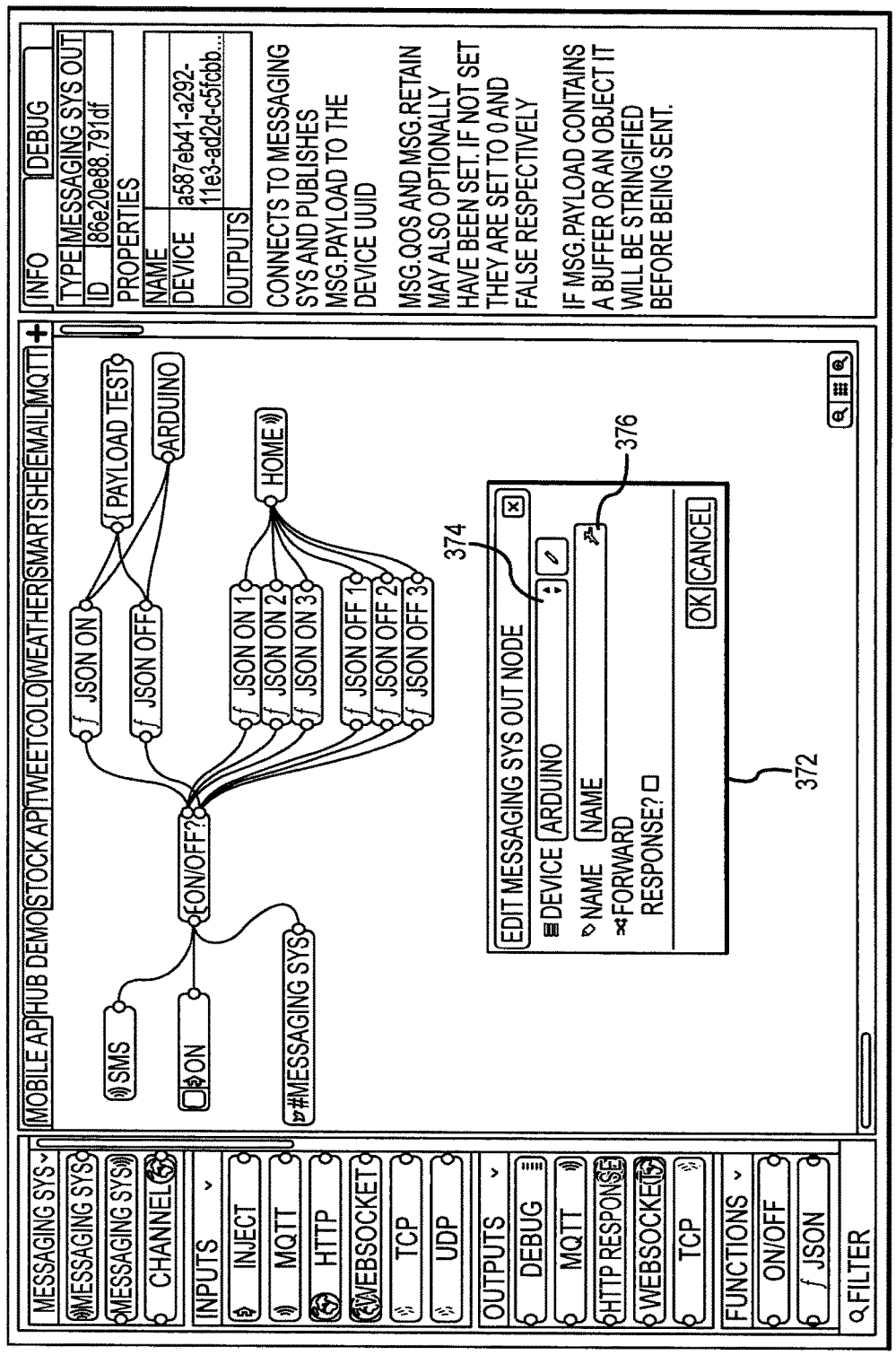

FIG. 3F shows a window 372 associated with output block 322. Window 372 may include a device selector 374 that enables a user to select an output device from a drop down list of registered output devices. Window 372 may also include a name field 376.

Figure 4:
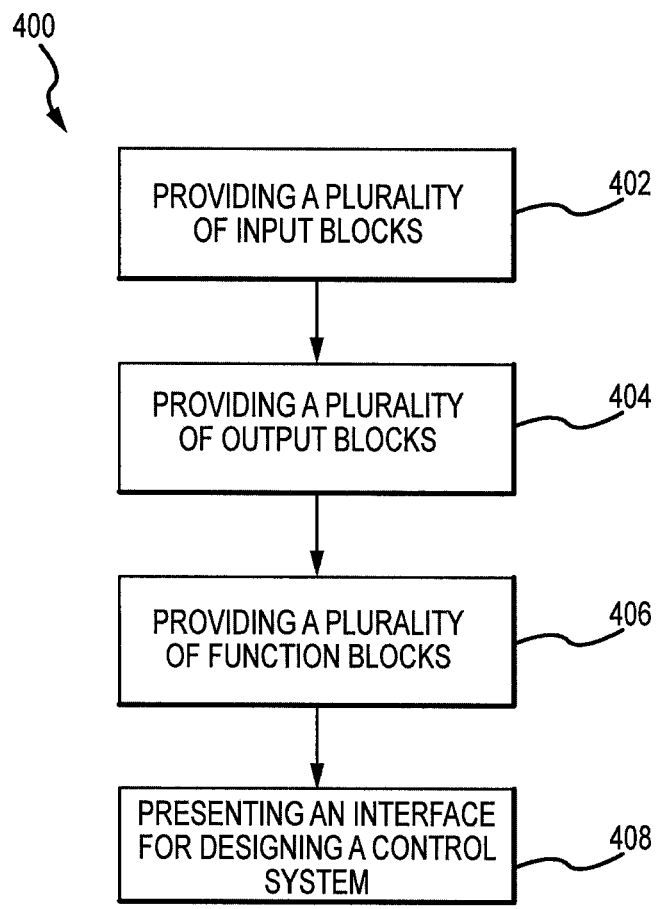
FIG. 4 illustrates a method providing a tool for designing a control system for an IoT device, according to embodiments of the invention.

FIG. 4 depicts a method 400 for providing a tool for designing a control system for an IoT device is provided. The method 400 may include providing a number of input blocks at block 402. Information or another payload may be provided to other blocks of the control system by the input blocks. For example, a device or system represented by an input block may deliver a payload, such as sensor data, to one or more functions represented by function blocks and/or output blocks. An input block may represent an IoT device, a third-party messaging account, or a computing device. Each IoT device, third-party messaging account, or computing device may be identified using a distinct UUID. For example, an input block may represent a third-party messaging account identified by the UUID. The input block may provide information that includes a message from the third party messaging account. In some embodiments, an input block may represent a speech integration device that allows a user to control an IoT device using voice commands. The voice command are received by a device or system represented by the input block. The input block sends the commands to one or more functions represented by function blocks and/or output blocks. A device represented by the output block may be provided a command related to the voice commands.

The method 400 may also include providing a plurality of output blocks at block 404. An output block may also represent an IoT device, a third-party messaging account, or a computing device. The IoT device, third-party messaging account, or computing device may also be identified using a UUID. In some embodiments, the input blocks and output blocks represent distinct IoT devices, third-party messaging accounts, or computing devices. Each IoT device, third-party messaging account, or computing device is provided a distinct UUID that is used by the tool for identification. At least one input block or at least one output block may represent the IoT device.

The method 400 may further include providing a number of function blocks at block 406. A function block may represent a function configured to process at least a portion of information received from at least one of the plurality of input blocks. In some embodiments, the function represented by a function blocks may include user-editable computer code that is configured to process at least a portion of the information and to provide the command to at least one of the output blocks. A function represented by a function block may include any type of computer code. For example, a function represented by a function block may include editable JavaScript Open Notation (JSON) that allows users to edit and/or write code for a custom process. The UUID associated with the input block may be used by a function represented by the function block to determine the IoT device, third-party messaging account, or computing device from which to receive the information. The functions represented by function blocks may be further configured to provide a command to at least one of the output blocks. The UUID associated with the output block may be used to determine which IoT device, third-party messaging service, or computing device to provide the command. In some embodiments, the IoT device, third-party messaging account, or computing device represented by the input block and the IoT device, third-party messaging account, or computing device represented by the output block communicate over a network.

The method 400 may also include presenting a graphical interface for designing the control system for the IoT device at block 408. The input blocks, the output blocks, and the function blocks may be positionable in the graphical interface to form the control system. In some embodiments, the input blocks, the output blocks, and the function blocks are draggable and droppable onto the graphical interface to be linked to form the control system for the IoT device. Each block may include one or more nodes that indicate where a payload may be received or sent. Blocks are connectable at these nodes to design the control system.

The design tool described herein may allow a user to design complex control systems for IoT devices. The input, output, and function blocks may be arranged on the graphical interface in any number of permutations by dragging and dropping the blocks to form a user-defined control system. These control systems may be simple, single layer systems that enable communication from devices and/or systems from a single source or manufacturer, or may be very complex, multi-layered control systems involving any number of systems and/or devices from various manufacturers. These complex systems may include a series of functions performed on inputs to enable a user to highly customize an output of a device represented by an output block. Many of the blocks include pre-defined computer code such that a user may design an advanced control system with this tool with little to no computer programming ability. The design tool may also include editable function blocks that allow a more advanced user to further customize a control system to take full advantage of the capabilities of a device and/or system.

Figure 5:
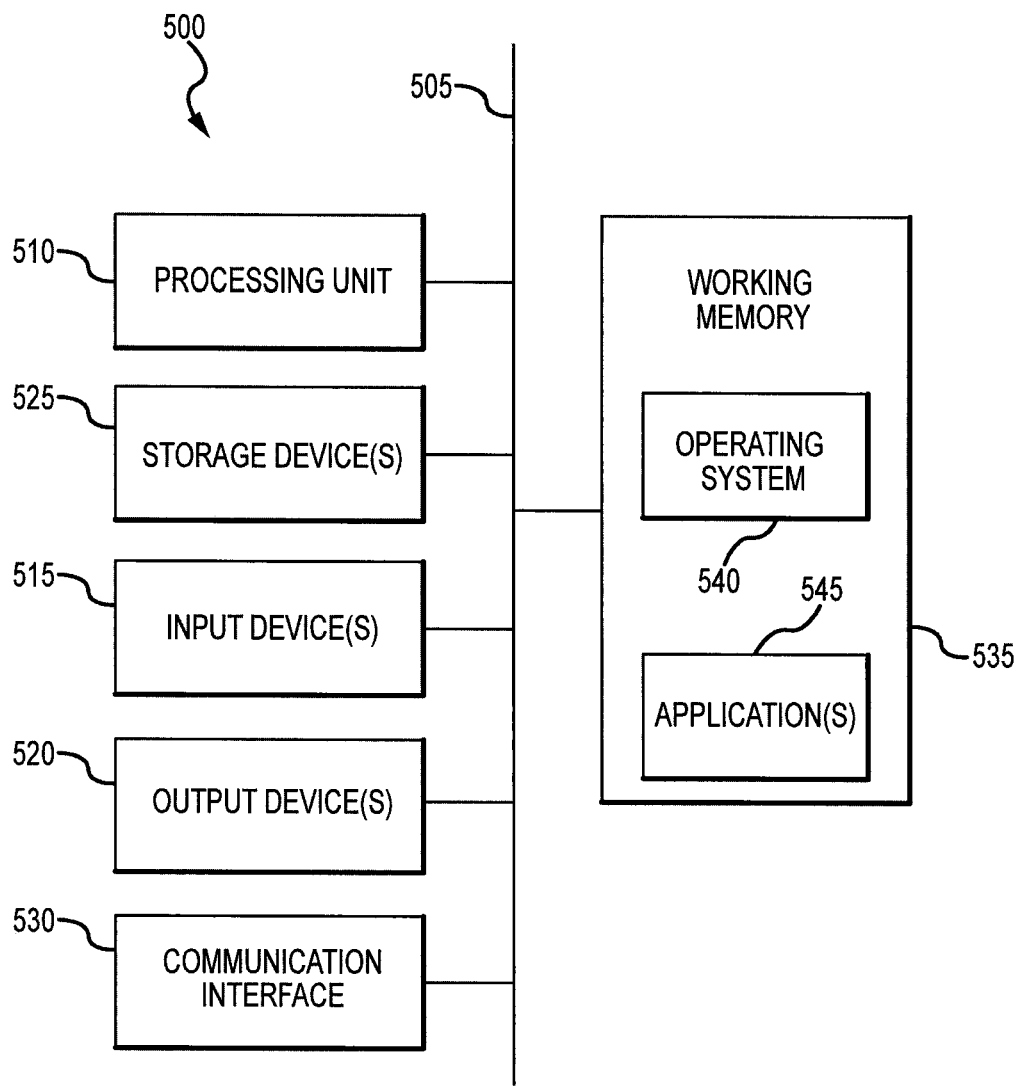
FIG. 5 is a block diagram of an example of a computing system.

A computer system as illustrated in FIG. 5 may be incorporated as part of the previously described computing devices and systems. For example, computer system 500 can represent some of the components of the messaging system 102, platform network 108 of FIG. 1, as well as any of the IoT devices, third-party messaging accounts, and/or computing devices and systems described herein. FIG. 6 provides a schematic illustration of one embodiment of a computer system 500 that can perform the methods provided by various other embodiments, as described herein, and/or can function as the host computer system, a remote kiosk/terminal, a point-of-sale device, a mobile device, and/or a computer system. FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include a processing unit 510, including without limitation one or more general-purpose processors and/or one or more special-purpose processors (such as digital signal processing chips, graphics acceleration processors, and/or the like); one or more input devices 515, which can include without limitation a mouse, a keyboard, a touchscreen, a global positioning system (GPS) receiver, a motion sensor, a camera, and/or the like; and one or more output devices 520, which can include without limitation a display device, a speaker, a printer, and/or the like.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communication interface 530, which can include without limitation a modem, a network card (wireless or wired), an infrared communication device, a wireless communication device and/or chipset (such as a Bluetooth™ device, an 502.11 device, a WiFi device, a WiMax device, an NFC device, cellular communication facilities, etc.), and/or similar communication interfaces. The communication interface 530 may permit data to be exchanged with a network (such as the network described below, to name one example), other computer systems, and/or any other devices described herein. In many embodiments, the computer system 500 will further comprise a non-transitory working memory 535, which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 510, applications 545, etc.) Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processing unit 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processing unit 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processing unit 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communication interface 530 (and/or the media by which the communication interface 530 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a non-transitory storage device 525 either before or after execution by the processing unit 510.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A control system comprising:
   one or more processors;
   one or more input blocks, an input block representing a first Internet of Things (IoT) device, a first third-party messaging account, or a first computing device, wherein the first IoT device, the first third-party messaging account, or the first computing device is identified using a first universally unique identifier (UUID);
   one or more output blocks, an output block representing a second IoT device, a second third-party messaging account, or a second computing device, wherein the second IoT device, the second third-party messaging account, or the second computing device is identified using a second UUID, and wherein an IoT device includes sensing or control functionality; and
   one or more function blocks, a function block representing a function configured to process information received from at least one of the one or more input blocks, wherein the first UUID is used to determine the first IoT device, the first third-party messaging account, or the first computing device from which to receive the information, the one or more function blocks being further configured to provide a command to at least one of the one or more output blocks, wherein the second UUID is used to determine the second IoT device, the second third-party messaging account, or the second computing device to provide the command, wherein the one or more input blocks, the one or more output blocks, and the one or more function blocks are positionable in an interface to form the control system, and wherein the control system is dynamically configurable to customize an output of the control system using a position of the one or more input blocks, the one or more output blocks, and the one or more function blocks within the control system.

2. The control system of claim 1, wherein one of the one or more input blocks represents the first third-party messaging account identified by the first UUID, and wherein the information includes a message from the first third-party messaging account.

3. The control system of claim 1, wherein the function represented by at least one of the one or more function blocks comprises user-editable computer code that is configured to process at least a portion of the information and to provide the command to the at least one of the one or more output blocks.

4. The control system for of claim 1, wherein at least one of the one or more input blocks represents a speech integration device that allows a user to control an IoT device using voice commands.

5. The control system of claim 1, wherein the one or more input blocks, the one or more output blocks, and the one or more function blocks are draggable and droppable onto the interface to be linked to form the control system for the IoT device.

6. The control system of claim 1, wherein an input block, an output block, or a function block represents an application programming interface (API).

7. The control system of claim 1, wherein the first IoT device, the first third-party messaging account, or the first computing device represented by an input block and the second IoT device, the second third-party messaging account, or the second computing device represented by an output block communicate over a network.

8. A method comprising:
providing, by a computing device, one or more input blocks, an input block representing a first Internet of Things (IoT) device, a first third-party messaging account, or a first computing device, wherein the first IoT device, the first third-party messaging account, or the first computing device is identified using a first UUID;
providing, by the computing device, one or more output blocks, an output block representing a second IoT device, a second third-party messaging account, or a second computing device, wherein the second IoT device, the second third-party messaging account, or the second computing device is identified using a second UUID, and wherein an IoT device includes sensing or control functionality;
providing, by the computing device, one or more function blocks, a function block representing a function configured to process at least a portion of information received from at least one of the one or more input blocks, wherein the first UUID is used to determine the first IoT device, the first third-party messaging account, or the first computing device from which to receive the information, the one or more function blocks being further configured to provide a command to at least one of the one or more output blocks, wherein the second UUID is used to determine the second IoT device, the second third-party messaging account, or the second computing device to provide the command; and
presenting, by the computing device, an interface for designing a control system, wherein the one or more input blocks, the one or more output blocks, and the one or more function blocks are positionable in the interface to form the control system, and wherein the control system is dynamically configurable to customize an output of the control system using a position of the one or more input blocks, the one or more output blocks, and the one or more function blocks within the control system.

9. The method of claim 8, wherein one of the one or more input blocks represents the first third-party messaging account identified by the first UUID, and wherein the information includes a message from the first third-party messaging account.

10. The method of claim 8, wherein the function represented by at least one of the one or more function blocks comprises user-editable computer code that is configured to process at least a portion of the information and to provide the command to the at least one of the one or more output blocks.

11. The method of claim 8, wherein at least one of the one or more input blocks represents a speech integration device that allows a user to control an IoT device using voice commands.

12. The method of claim 8, wherein the one or more input blocks, the one or more output blocks, and the one or more function blocks are draggable and droppable onto the interface to be linked to form the control system for the IoT device.

13. The method of claim 8, wherein an input block, an output block, or a function block represents an API.

14. The method of claim 8, wherein the first IoT device, the first third-party messaging account, or the first computing device represented by an input block and the second IoT device, the second third-party messaging account, or the second computing device represented by an output block communicate over a network.

15. A computer-program product tangibly embodied in a non-transitory machine-readable medium of a computing device, including instructions configured to cause one or more processors instructions to:
provide one or more input blocks, an input block representing a first IoT device, a first third-party messaging account, or a first computing device, wherein the first IoT device, the first third-party messaging account, or the first computing device is identified using a first UUID;
provide one or more output blocks, an output block representing a second IoT device, a second third-party messaging account, or a second computing device, wherein the second IoT device, the second third-party messaging account, or the second computing device is identified using a second UUID, and wherein an IoT device includes sensing or control functionality;
provide one or more function blocks, a function block representing a function configured to process at least a portion of information received from at least one of the one or more input blocks, wherein the first UUID is used to determine the first IoT device, the first third-party messaging account, or the first computing device from which to receive the information, the one or more function blocks being further configured to provide a command to at least one of the one or more output blocks, wherein the second UUID is used to determine the second IoT device, the second third-party messaging account, or the second computing device to provide the command; and
present an interface for designing a control system, wherein the one or more input blocks, the one or more output blocks, and the one or more function blocks are positionable in the interface to form the control system, and wherein the control system is dynamically configurable to customize an output of the control system using a position of the one or more input blocks, the one or more output blocks, and the one or more function blocks within the control system.

16. The computer-program product of claim 15, wherein one of the one or more input blocks represents the first third-party messaging account identified by the first UUID, and wherein the information includes a message from the first third-party messaging account.

17. The computer-program product of claim 15, wherein the function represented by at least one of the one or more function blocks comprises user-editable computer code that is configured to process at least a portion of the information and to provide the command to the at least one of the one or more output blocks.

18. The computer-program product of claim 15, wherein:
at least one of the one or more input blocks represents a speech integration device that allows a user to control an IoT device using voice commands.

19. The computer-program product of claim 15, wherein:
the one or more input blocks, the one or more output blocks, and the one or more function blocks are draggable and droppable onto the interface to be linked to form the control system for at least one IoT device.

20. The computer-program product of claim 15, wherein:
an input block, an output block, or a function block represents an API.

* * * * *

UNITED STATES PATENT AND TRADEMARK OFFICE
CERTIFICATE OF CORRECTION

PATENT NO. : 9,791,841 B2
APPLICATION NO. : 14/458054
DATED : October 17, 2017
INVENTOR(S) : Chris Matthieu and Geir Ramleth It is certified that error appears in the above-identified patent and that said Letters Patent is hereby corrected as shown below:

Column 22, Line 62, Claim 4: Please delete "for" from "The control system for of claim 1"

Signed and Sealed this
Thirteenth Day of February, 2018

Andrei Iancu
*Director of the United States Patent and Trademark Office*